United States Patent
Pande et al.

(10) Patent No.: US 12,051,101 B2
(45) Date of Patent: *Jul. 30, 2024

(54) VOICE-BASED IN-STORE DIGITAL CHECKOUT SYSTEM

(71) Applicant: Target Brands, Inc, Minneapolis, MN (US)

(72) Inventors: Amit Pande, Ames, IA (US); Jesse Berwald, Minneapolis, MN (US)

(73) Assignee: Target Brands, Inc., Minneapolis, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/052,338

(22) Filed: Nov. 3, 2022

(65) Prior Publication Data

US 2023/0106848 A1    Apr. 6, 2023

Related U.S. Application Data

(63) Continuation of application No. 16/213,477, filed on Dec. 7, 2018, now Pat. No. 11,532,028.

(51) Int. Cl.
| | |
|---|---|
| *G06Q 30/0601* | (2023.01) |
| *G06Q 20/20* | (2012.01) |
| *G06Q 20/32* | (2012.01) |
| *G10L 15/22* | (2006.01) |
| *G10L 15/26* | (2006.01) |

(Continued)

(52) U.S. Cl.
CPC ....... *G06Q 30/0635* (2013.01); *G06Q 20/203* (2013.01); *G06Q 20/322* (2013.01); *G06Q 30/0631* (2013.01); *G06Q 30/0633* (2013.01); *G06Q 30/0641* (2013.01); *G10L 15/22* (2013.01); *G10L 15/26* (2013.01);

(Continued)

(58) Field of Classification Search
CPC ............. G06Q 30/0635; G06Q 20/203; G06Q 20/322; G06Q 30/0631; G06Q 30/0633; G06Q 30/0641; G10L 15/22; G10L 15/26; G10L 2015/223; G06K 7/10297; G06K 7/1413
USPC ...................................... 705/26.81
See application file for complete search history.

(56) References Cited

U.S. PATENT DOCUMENTS

| | | |
|---|---|---|
| 7,997,486 B2 | 8/2011 | Ulrich et al. |
| 9,202,247 B2 | 12/2015 | Pettyjohn et al. |

(Continued)

FOREIGN PATENT DOCUMENTS

| | | | | |
|---|---|---|---|---|
| CN | 107330750 A | * | 11/2017 | ......... G06Q 30/0631 |
| CN | 107330750 A | | 11/2017 | |

OTHER PUBLICATIONS

Yuan, Huiru, et al., "Matching Recommendations based on Siamese Network and Metric Learning", 2018, School of Economics and Management, Beihang University, Beijing, China (Year: 2018).*

(Continued)

*Primary Examiner* — Marissa Thein
*Assistant Examiner* — Thomas Joseph Sullivan

(57) ABSTRACT

Methods and systems for providing a digital cart management system for use by customers within a retail location. In use, a customer shops within a retail location and adds items to a digital cart as the customer is adding the items to a physical cart, e.g., at least in part by voice input. When the customer is finished shopping, the customer can checkout via a digital process, thereby bypassing point of sale devices at the retail location.

20 Claims, 11 Drawing Sheets

(51) Int. Cl.
 *G06K 7/10* (2006.01)
 *G06K 7/14* (2006.01)
(52) U.S. Cl.
 CPC ....... *G06K 7/10297* (2013.01); *G06K 7/1413* (2013.01); *G10L 2015/223* (2013.01)

(56) References Cited

U.S. PATENT DOCUMENTS

| | | | |
|---|---|---|---|
| 9,940,396 | B1 | 4/2018 | Willhoit |
| 10,424,009 | B1 | 9/2019 | Paton et al. |
| 10,636,074 | B1 | 4/2020 | Bentley et al. |
| 2006/0242011 | A1 | 10/2006 | Bell et al. |
| 2008/0189187 | A1 | 8/2008 | Hao et al. |
| 2009/0125406 | A1 | 5/2009 | Lewis et al. |
| 2012/0158589 | A1 | 6/2012 | Katzin et al. |
| 2013/0218721 | A1* | 8/2013 | Borhan .................. G06Q 30/02 705/26.41 |
| 2013/0282533 | A1 | 10/2013 | Foran-Owens et al. |
| 2014/0207615 | A1 | 7/2014 | Li et al. |
| 2015/0012426 | A1 | 1/2015 | Purves et al. |
| 2015/0106221 | A1 | 4/2015 | Tapley et al. |
| 2016/0350825 | A1 | 12/2016 | Hertschuh et al. |
| 2016/0353235 | A1 | 12/2016 | Williams et al. |
| 2016/0371766 | A1* | 12/2016 | Schmidt ............. G06Q 30/0633 |
| 2018/0108001 | A1 | 4/2018 | Taylor et al. |
| 2018/0218429 | A1* | 8/2018 | Guo ........................ G06N 3/045 |
| 2018/0232817 | A1 | 8/2018 | Isaacson et al. |
| 2019/0050427 | A1 | 2/2019 | Wiesel et al. |
| 2019/0370879 | A1* | 12/2019 | Bhattacharjee ........ G06N 3/045 |
| 2020/0043076 | A1 | 2/2020 | Houbart et al. |

OTHER PUBLICATIONS

Holder, Christopher et al, "Visual Siamese Clustering for Cosmetic Product Recommendation", Oct. 26, 2018, 14th Asian Conference on Computer Vision (ACCV) (Year: 2018).*

Zumbach, Lauren, Chicago Tribune, "Frustrated by self-checkout? Retailers Look to smartphones to cut the line", Dated: Dec. 12, 2016, 3 Pages.

Perez, Sarah, "Walmart and Google partner on voice-based shopping", TechCrunch, Dated: Aug. 22, 2017, 12 pages.

Yuan, Huiru, et al, "Matching Recommendations based on Siamese Network and Metric Learning", 2018, Schoolof Economics and Management, Beihang University, China (Year: 2018).

* cited by examiner

VOICE-BASED IN-STORE DIGITAL CHECKOUT SYSTEM

CROSS REFERENCE TO RELATED APPLICATION

This is a continuation application of U.S. patent application Ser. No. 16/213,477 filed on Dec. 7, 2018, now U.S. Pat. No. 11,532,028. The entire contents of the earlier applications are incorporated herein by reference.

TECHNICAL FIELD

The present disclosure relates generally to methods and systems for providing a digital checkout system for customer use within a retail location.

BACKGROUND

Even with the rise of online shopping, consumers still shop at retail stores to purchase items. While shopping online provides many conveniences, consumers still desire to shop in person for various reasons. Shopping in person allows a customer to browse aisles and look at items in person. When shopping, a customer browses shelves and selects items they want to purchase. The customer places the items in their physical cart and then proceeds to a checkout, or point of sale (POS). A traditional checkout requires the user to unload their physical cart and have an employee (or the user, in the case of a self-checkout station) scan each item. Then a payment is processed and a receipt is issued.

However, since the user has to place the items in their physical cart, unload the cart, and load the cart again after the checkout process, in-person shopping at a retail location remains an inefficient process. For at least these reasons, it is desirable to provide a more streamlined in-person retail experience.

SUMMARY

In general, a voice based smart checkout system enables guests to enhance their in-store shopping and checkout experience. Aspects of the in-store shopping experience include assisting guests with locating items in the store through a retailer application (using voice-based or text input commands), identifying items placed in the guest's physical shopping cart (using RFID tags, bar code scans, text input, or voice input), providing item recommendations (based on items in the guest's shopping cart, shopping list, or previous purchases), and mapping the guest's shopping route in the store (based on, for example, the customer's shopping list).

In particular, in a first aspect, a method of providing a digital checkout is described. The method includes: receiving, at a mobile device, a customer identifier associated with a user including a payment method and a digital cart; receiving, at the mobile device, a first voice input including a request to add an item to the digital cart; identifying one or more matching items by converting the first voice input to a text format and comparing the text format to items listed in an inventory datastore; presenting the one or more matching items on the mobile device; receiving a selection of one or the one or more matching items to be added to the digital cart; obtaining item information for the one matching item including a description and an item price from the inventory datastore, and associating the item information with the one matching item at the digital cart; receiving a request to complete a digital checkout; and settling a payment transaction including at least one matching item added to the digital cart.

In a second aspect, a retail web server configured for providing a digital checkout includes a computing system including at least one processor communicatively connected to a memory, the memory storing computer-executable instructions comprising a software tool which, when executed causes the system to: receive, at a mobile device, a customer identifier associated with a user including a payment method and a digital cart; receive, at the mobile device, a first voice input including a request to add an item to the digital cart; identifying one or more matching items by converting the first voice input to a text format and comparing the text format to items listed in an inventory datastore; present the one or more matching items on the mobile device; receive a selection of one of the one or more matching items to be added to the digital cart; obtain item information for the one matching item including a description and an item price from the inventory datastore, and associating the item information with the one matching item at the digital cart; receive a request to complete a digital checkout; and settle a payment transaction including at least the one matching item added to the digital cart.

In yet another aspect, a method of providing a digital checkout is described. The method includes: receiving, at a mobile device, a customer identifier associated with a user including a shopping list, payment method, and a digital cart; presenting the shopping list and an in-store location of each item on the shopping list on the mobile device; receiving, at the mobile device, a first voice input including a request to add an item to the digital cart; identifying one or more matching items by converting the first voice input to a text format and comparing the text format to items listed in an inventory datastore; presenting the one or more matching items on the mobile device; receiving a selection of one of the one or more matchings items to be added to the digital cart; obtaining item information for the one matching item including a description and an item price from the inventory datastore and associating the item information with the one matching item at the digital cart; presenting an item recommendation based on the one matching item; receiving a request to complete a digital cart checkout; and settling a payment transaction including at least the one matching item added to the digital cart.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

DETAILED DESCRIPTION

Figure 1:
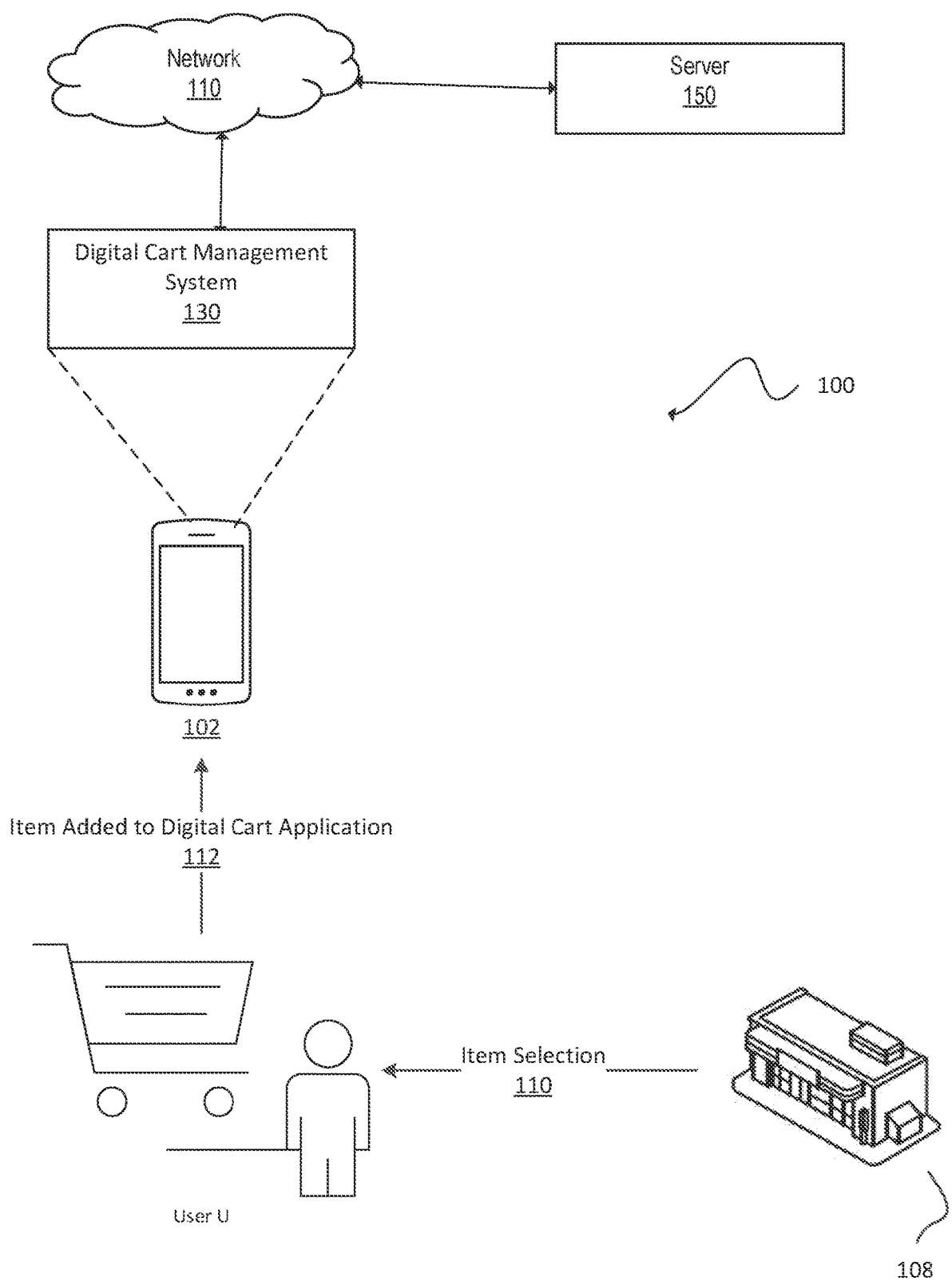
FIG. 1 illustrates a schematic diagram of a system for using a digital cart management system within a retail location.

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

The present disclosure describes systems and methods for providing a digital checkout management system for use by a customer (herein also referred to as a "user") within a retail location. A user physically selects at least one item for purchase in a retail location. As the user places the item into an actual cart, the user can add the item to a digital cart using a mobile device. When the user is done shopping, the user is able to complete the transaction on the mobile device without having to go through a traditional in-store checkout process. In certain use cases, the user digitally "selects" the same item concurrently with physical selection of the item. The user may, for example, use voice input to his/her mobile device to describe the item. A uniquely identifiable item can then be directly added to a digital cart for checkout. If multiple items are implicated by the voice input, the user may confirm on the mobile device the item that is intended. The mobile device may also provide guidance to the user in finding a physical location of an item based on voice input, in various embodiments.

In general, the digital cart management system enables guests to enhance their in-store shopping and checkout experience. Aspects of the in-store shopping experience include assisting guests with locating items in the store through the retail location's application (using voice-based or text input commands), identifying items placed in the guest's physical shopping cart (using RFID tags, bar code scans, text input, or voice input), providing item recommendations (based on items in the guest's shopping cart, shopping list, and/or previous purchases), and mapping out the guest's shopping route in the store (based on, for example, the user's shopping list). This shopping experience enables the application executing on the guest's mobile device to assist the user in making purchases, recommend items, and guide the guest through the store. For example, a user may use his/her voice to add items to a shopping list within the application, which can identify a location of the identified item. Additionally, the user could add the item to his/her cart by voice. If multiple different items are possible based on the voice input, the user may be presented with a selection of the item to be added/selected.

Aspects of the checkout experience include a seamless checkout experience that allows users to bypass a traditional checkout line. In particular, aspects disclose identifying items in a user's shopping cart. In some examples, this may be accomplished using RFID tags on products, bar code scans, text input, or voice input, allowing the system to automatically charge the user's credit card upon receiving an indication in an application on the mobile device that the user has completed shopping, or based on a user location (e.g., exiting the store) as detected by item or mobile device location. Accordingly, the requirement of waiting in line, scanning each product manually by a cashier, and physically providing payment at the register can be reduced and/or avoided.

FIG. 1 illustrates a system 100 for providing a digital checkout process for use in a brick-and-mortar store (herein referred to as a "retail location"), according to an example embodiment described herein. The system includes a digital cart management system 130 on a mobile device 102 communicatively connected to a server 150 via network 110 (e.g., the Internet).

A digital cart management system 130 is used to facilitate a digital checkout process of a user within a retail location. An example shopping experience includes having a user U shop at a retail location 108 and at 110 select an item that they want to purchase. At 112, the item is added to the digital cart management system 130 with the user of a mobile device 102. As explained in further detail below, when a user U is at a retail location 108, the user U selects an item from a shelf and indicates to the digital cart management system 130 which item the user U has selected. When that item is added to the actual cart, it is also added to a digital cart. When a user U is done shopping and wants to checkout, the digital cart management system 130 processes the order without the user having to checkout through a traditional in-store checkout.

A user U can add items to the digital cart management system 130 through a number of means. For example, the user can scan items using their mobile device (such as RFID tags or bar code scans), add items using text input, or add items using voice input.

The network 110 allows for communication between one or more computing devices in the system 100. The network 110 can be a wired network or a wireless network such as the Internet.

Figure 2:
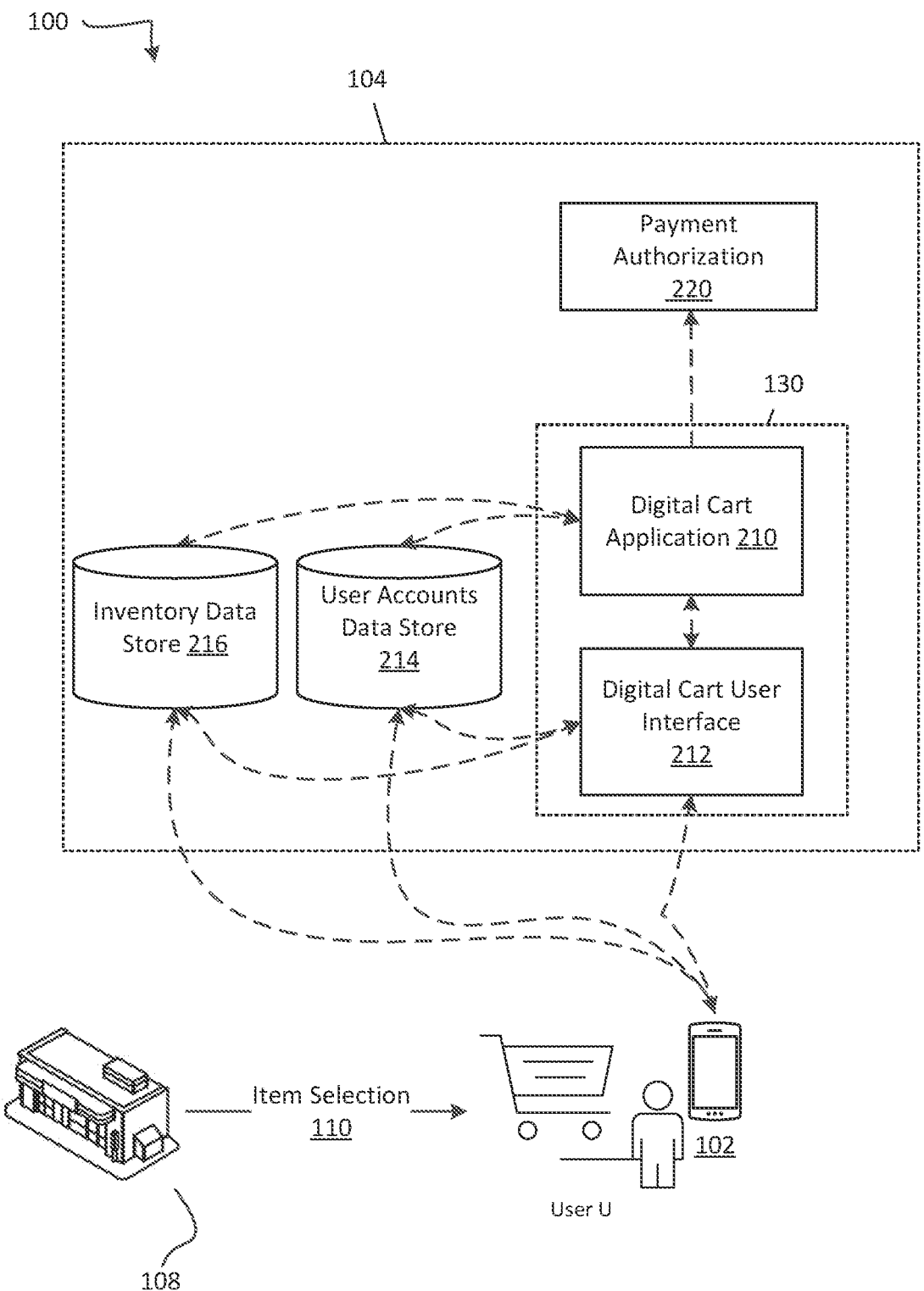
FIG. 2 illustrates a detailed block diagram of the system of FIG. 1.

FIG. 2 illustrates a more detailed schematic diagram of the system 100 of FIG. 1. The schematic is simplified to illustrate how a user U operating a digital cart management system 130 completes a transaction on their mobile device 102.

The retailer platform 104 includes the digital cart management system 130. The digital cart management system 130 includes a digital cart application 210 and a digital cart user interface 212.

The digital cart application 210 receives inputs and orders placed through the digital cart user interface 212 from a user on a mobile device 102. The digital cart application 210 accesses information from, at least, the user accounts datastore 214 and inventory datastore 216 that is needed to complete an order. The information gathered by the digital cart application 210 is processed and delivered to a payment authorization engine 220. A payment authorization engine 220 authorizes the payment once the user has requested a checkout.

The user interface 212 presents a graphical user interface on a website or application hosted by the retailer. The GUI can be shown in different views or pages having different functions. For example, the GUI can present one page for adding items to a shopping list, individual pages for each item, a page for items in the digital shopping cart, and a one or more pages for the checkout process.

The GUI can receive and process inputs various ways. In a first example, the GUI includes functionalities to scan QR codes or bar codes on items to be added to the digital cart. In another example, the GUI includes buttons that a user can select to add items to the digital cart or press to complete the checkout process. Still further, the GUI can include functionalities to process audio inputs from a user.

The online retailer platform 104 further includes a user accounts datastore 214, an inventory datastore 216, and payment authorization engine 220.

The user accounts datastore 214 operates to store user account information for users of the retailer. Generally, a user may be required to set up an account in order for information to be stored about a particular user. The user can then login to the user account to access saved information relevant to use of the retailer website. The user accounts datastore 214 is described in greater detail with respect to FIG. 4.

The inventory datastore 216 operates to store information about available inventory offered for sale by the retailer. The inventory datastore 216 tracks the current available inventory at a number of retailer locations including warehouses and stores. The inventory datastore 216 is described in greater detail with respect to FIG. 5.

The inventory datastore 216 can further be used to narrow down the list of potential items the user is adding to their digital cart. For example, if a user selects a product to add to their digital cart while shopping in-store, the inventory datastore 216 narrows down the list of potential items by determining what items are in stock at that particular retail location. This makes it quicker and easier for the digital cart application 210 to find the correct item.

The payment authorization engine 220 processes payment information. In an example, the payment authorization engine 220 uses an encrypted payment device, such as a Verifone® payment terminal, and captures clear-text payment account numbers with the .com user interface, subsequent encryption, and processing of the data using a secure region.

Figure 3:
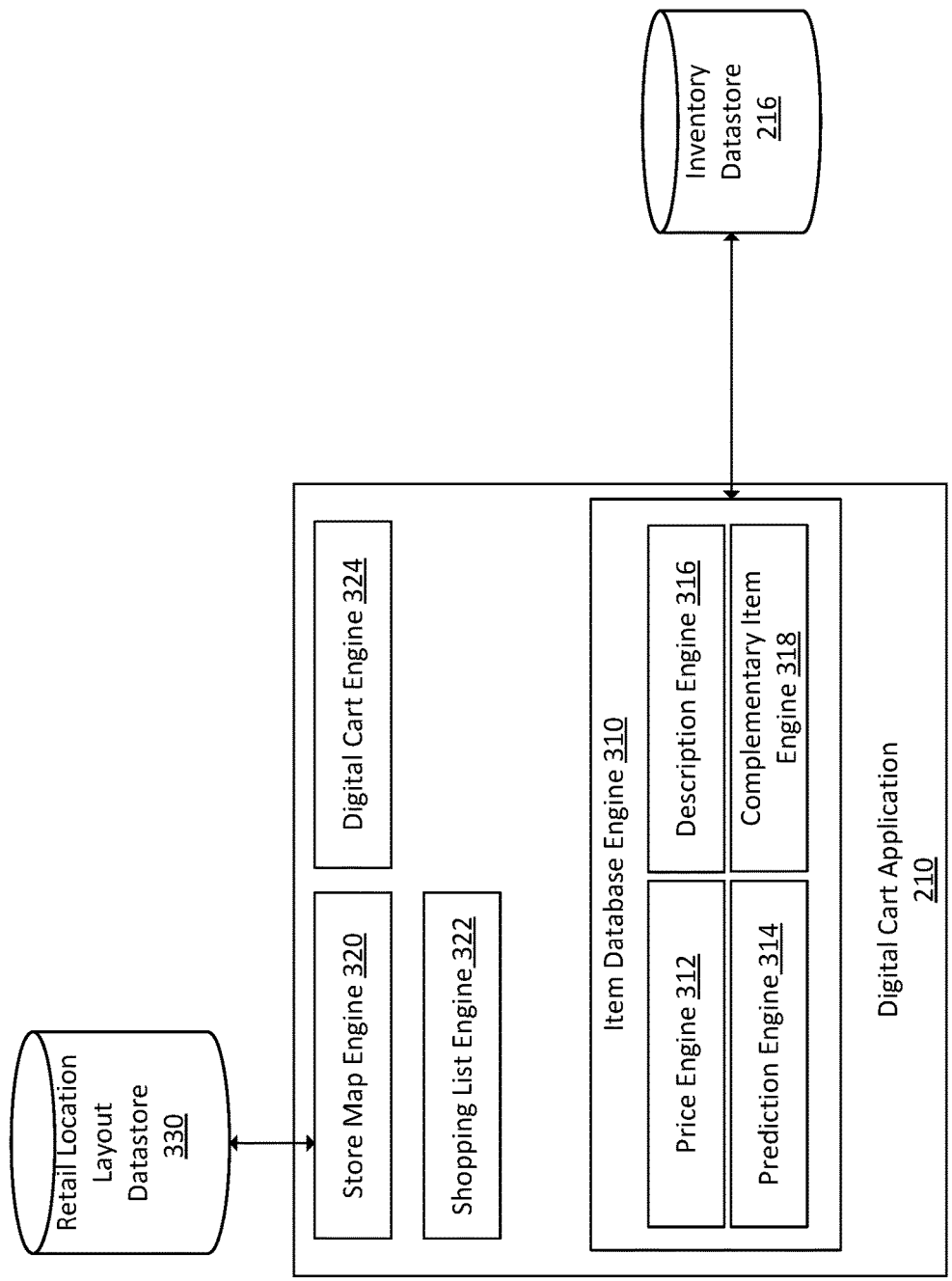
FIG. 3 illustrates a detailed block diagram of the digital cart application of FIG. 2.

FIG. 3 illustrates an example embodiment of a digital cart application 210. The digital cart application 210 includes an item database engine 310, store map engine 320, shopping list engine 322, and digital cart engine 224.

Item database engine 310 includes at least a price engine 312, prediction engine 314, description engine 316, and complementary item engine 318.

Price engine 312 includes and gathers pricing information for items within the inventory datastore 216. Pricing information includes a single item price for each item. Price engine 312 also calculates the total price of the items in the cart, including the item totals, as well as additional costs, such as tax.

Price engine 312 may include information relating to sales, promotions, or coupons that affects the price of items. Alternatively, price engine 312 may communicate with other engines (not shown) that includes information relating to the price of items. Example engines include promotional engine, which determines if the item is associated with a sale or promotion; tax engine, which determines the tax category associated with the item; a coupon engine that validates coupon identifiers; and a payment restriction engine, which determines if an item has a restricted payment method allowed.

Prediction engine 314 predicts items that a user may want to purchase based on past purchases of the user or based on items placed in the digital cart as the user is shopping. Predicting the next item includes considering specific item classes to determine which specific classes of items have been purchased in the past (with some degree of regularity) and is then used to predict shopping behavior for at least "frequent" items (e.g., items purchased more than X times in the past predetermined amount of time).

For example, the prediction engine 314 may add predicted items to the user's shopping cart. Prediction engine 314 may also be used to narrow down the list of potential items the user is adding to their digital cart. For example, if a user adds yogurt to their digital shopping cart, the prediction engine 314 narrows down the list of potential items based on the shopping history of the user. If the use always purchases the same yogurt, the prediction engine 314 can use that information so the digital cart application 210 can more quickly identify the item the user is adding to the digital cart.

Description engine 316 includes and maintains gathering product information for items within the datastore of the retail enterprise. Product information includes, but is not limited to an item description, available sizes or colors, and other similar information.

Further, description engine 316 maintains information related to item restrictions, such as restrictions on liquor sales or video games, quantity restrictions on limited quantity items or gift card purchase amounts.

A product restriction engine (not shown) determines if there are any restrictions for purchase of the at least one item. If there are no restrictions for purchase of the at least one item, the product restriction engine does nothing further. If there are restrictions for purchase of the at least one item, the product restriction engine communicates to the server 150 that the transaction cannot be processed further until the restriction conditions are met. For example, if alcohol is selected for purchase, the item is flagged by the product restriction engine until the customer provides age identification. A user may provide age identification by taking a picture of their identification cart. Alternatively, a user may provide age identification by showing their identification card to a retail employee.

Complementary item engine 318 is useful for recommending complementary products to a user. Complementary products may refer to items that may be used together, i.e., those that complement one another in their function. Examples include a pair of trousers and a belt, a sofa and a cushion, etc. When consumers are viewing/purchasing items, it might make sense to recommend items that are complementary to them. Details regarding such a complementary item engine are provided in U.S. Provisional Patent Application No. 62/673,653, entitled "Complementary Product Recommendation Systems", the disclosure of which is hereby incorporated by reference in its entirety.

In accordance with the present disclosure, a neural network is trained to learn item representations that capture complementarity. The complementarity is a value that is generated based on a pair of items, with the model classifying that pair of items in a binary fashion as complementary or not complementary.

In accordance with the following disclosure, methods and systems for generating a set of one or more complementary items associated with an item is disclosed. One method includes receiving data identifying one or more pairs of complementary items from within an item collection, the one or more pairs of complementary items being a subset of all items included in the item collection, and generating a model of item complementarity based at least in part on the one or more pairs of complementary items and item descriptions of each of the items included in the item collection. The method includes receiving a selection of a seed item from within the item collection, and, in response to selection of the seed item, identifying one or more complementary items.

At least one of the seed item or the one or more complementary items is not included in the one or more pairs of complementary items included in the received data.

Certain aspects of the present disclosure include generating complementarity scores between the seed item and each of a plurality of items within the item collection, and, based on a complementarity score between the seed item and an item from among the plurality of items being above a predetermined complementarity threshold, including the item from among the plurality of items within the one or more complementary items.

Quoc Le and Tomas Mikolov, Distributed representations of sentences and documents, International Conference on Machine Learning, pages 1188-1196, 2014 describes harnessing the text descriptions and attributes associated with items and construct embeddings using Mikolov et. al's Doc2Vec/Paragraph2Vec model.

In application, the text data including the name, description and attributes of an item are considered its document and the model generates text embeddings for every item. The text descriptions and attributes of items can be derived from item descriptions from a website or inventory database.

A Siamese network with two identical subnet-works consisting of k Fully-Connected hidden layers is employed for the classification problem Identical subnetworks are those that have the same configuration with the same parameters and weights. The purpose of using this network is to project these text embeddings into an N-dimensional vector space where embeddings for items that are complementary to each other are located closer in the space, and those that are not, are located further apart.

For each pair of labeled items, the item text embeddings are fed in as an input to the Siamese Net. The network has k Fully-Connected hidden layers followed by an L2 distance layer between the embeddings of the last pair of hidden layers. (The results reported below are with k=2.) The loss function used to train the model is Contrastive Loss, which is of the form:

$$L(W,(Y,X_1,X_2)^i) = Y^i(D_W^i)^2 + (1-Y^i)(\max(0, 1-(D_W^i))^2$$

In the above, $(Y, X_1, X_2)^i$ is the ith labeled sample pair, $Y_i$ is the label of the ith pair (0 for non-complementary, 1 for complementary), and $D_i$ is the Euclidean distance between the pair of points.

Input labeled samples are split using stratified sampling into training and test data to maintain the label distribution. The model is evaluated in the following ways:

(a) Distances between complementary pairs vs. non-complementary pairs of items: The goal of the method was to project complementary items closer in the embedding space and push those that are non-complementary further apart. In order to show these results, we look at the distance distribution for the Siamese embeddings generated for the test data. Experimental results show the complementary items are indeed located closer to each other in the embedding space, as compared to the non-complementary ones.

(b) Classification metrics: Precision, Recall, Accuracy and AUC are computed on both training and held-out test data. These are computed by selecting a distance threshold. Pairs of items from the test data whose embeddings are within that threshold are deemed complementary and those that exceed the threshold are deemed non-complementary. In Table 1, below, the threshold used is 0.9.

TABLE 1

Classification metrics with distance threshold 0.9

| Dataset | Accuracy | Precision | Recall | AUC |
| --- | --- | --- | --- | --- |
| Training | 96.19 | 0.955 | 0.939 | 0.957 |
| Test | 93.59 | 0.928 | 0.892 | 0.926 |

Generating Complementary Product Recommendations

Using the trained model, the item text embeddings for all items of the chosen category (Home in this case) are fed into the model. The output of the last hidden layer yields item representations that help capture complementarity.

Given a seed item and its representation, we compute its nearest neighbors in order to generate recommendations for the item The items that lie closest in the embedding space to the seed item are served as recommendations. This computation can be conducted for example seed items in different departments of a retail website (e.g., home decor, home inspiration, and furniture). The computation can be used to display examples of the recommendations generated for each such category.

Store map engine 320 provides a retail location map to the user that indicates where inventory items are located within the store. Store map engine 320 can communicate with retail location layout datastore 330, which maintains the layout of retail locations. In a first example, a user indicates in which retail location they are shopping. In another example, the mobile device 102 utilizes GPS to determine in which retail location the user is shopping. Once the store map engine 320 determines which retail location the user is shopping at, the store map engine 320 can provide the user with an indication of where items are located within the retail location. The store map engine 320 could also provide the user with directions around a retail location to make shopping quicker.

For example, the store map engine 320 may provide the user with directions around the retail location for items listed on their shopping list or entered via user (e.g., voice) input. Alternatively, the user may ask the digital cart application 210 where a particular item is location, and the store map engine 320 will provide a location of that item to the user.

Shopping list engine 322 maintains a list of items that a user has added to a shopping list. In a first embodiment, shopping list engine 322 just maintains a list of items that a user has added to the list. In another embodiment, the shopping list engine 222 can include more information associated with each item listed in the shopping list. For example, the shopping list engine 222 can indicate which items are in stock at the retail location the user is shopping.

Shopping list engine 222 can communicate with prediction engine 314 to add items to the shopping list that the user may need to purchase. In the retail context, the prediction of items, including complementary items, can take the form of a shopping basket prediction system, where, based on past purchases of a user, the next shopping basket of that user is predicted. Predicting the next shopping basket includes considering specific item classes to determine which specific classes of items has been purchased in the past (with some degree of regularity) and is then used to predict shopping behavior for at least "frequent" items (e.g., items purchased more than X times in the past predetermined amount of time).

Digital cart engine 324 receives inputs from the user and stores items in a digital cart until the user is done shopping. The inputs first include items that the user desires to add to their digital shopping cart. Inputs also include confirmation that the correct item has been added to the digital shopping cart. Still further, inputs can include a desire to complete a checkout process.

Figure 4:
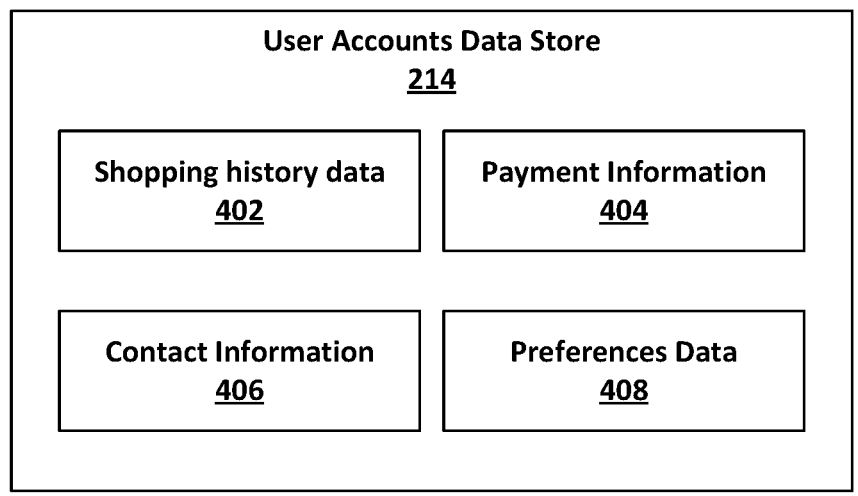
FIG. 4 illustrates a detailed block diagram of the user accounts datastore of FIG. 2.

FIG. 4 illustrates a detailed block diagram of the user accounts datastore 214 of FIG. 2. The user account datastore 214 may be linked by a customer identifier that includes a user ID used to log into an account. Alternatively, a customer identifier may be inferred from a payment method, such as a credit card, or having an in-store employee checking a customer identification card.

The example user accounts datastore 214 includes shopping history data 402, payment information 404, contact information 406, and preferences data 408. Information in the user accounts datastore 214 can be used to by the digital cart management system 130 to facilitate completing orders more quickly.

The shopping history data 402 includes information about previous browsing activity and orders placed by a particular user. A user can log into a user account on a retailer website or an application on a mobile device 102. Browsing activity on the retailer website can also be saved in association with the user account. This browsing activity can be used to inform recommendations and promotions that are presented to the user. Previously placed ordered can also be saved in association with the user account. This information can be accessed by the user later through a user account page. The user can access precious orders to review receipts, initiate returns, and leave feedback. Previous order information can be used to suggest repeat orders and make it easier for a user to browse items that the user has purchased in the past. The shopping history data 402 can also save preferences for retail stores that the user has shopped at or picked up order from in the past.

The payment information 404 includes information about methods of payment. A user can save payment information in a user account for use in placing future orders. For example, a user could place a first order and enter information for a credit card. That credit card information can be saved and auto populated during checkout for a second order. In some instances, a payment method can have discounts and benefits associated with its use. By saving that payment method in a user's account, the user can access those discounts and benefits whenever the user is logged into the retailer website.

The contact information 406 includes mailing addresses, billing addresses, email addresses, phone numbers, and other contact information for a user that is stored in a user account. In some embodiments, the mailing address or billing address is also a delivery address for same-day delivery orders. The email address can be used to login to the user account. The user can also receive confirmation messages, receipts, and other account information at the email addresses associated with the user account. The phone numbers can be landline or cellular phone numbers at which a user or users associated with a user account can be contacted.

The preferences data 408 saves information about a user's preferences while using the digital cart management system 130. Preferences can be saved for items, brands, categories of items, store locations, delivery modes, payment methods, and delivery addresses. Some preferences can be set directly by a user in a preferences page. Some preferences can be inferred from the shopping history data 402.

Figure 5:
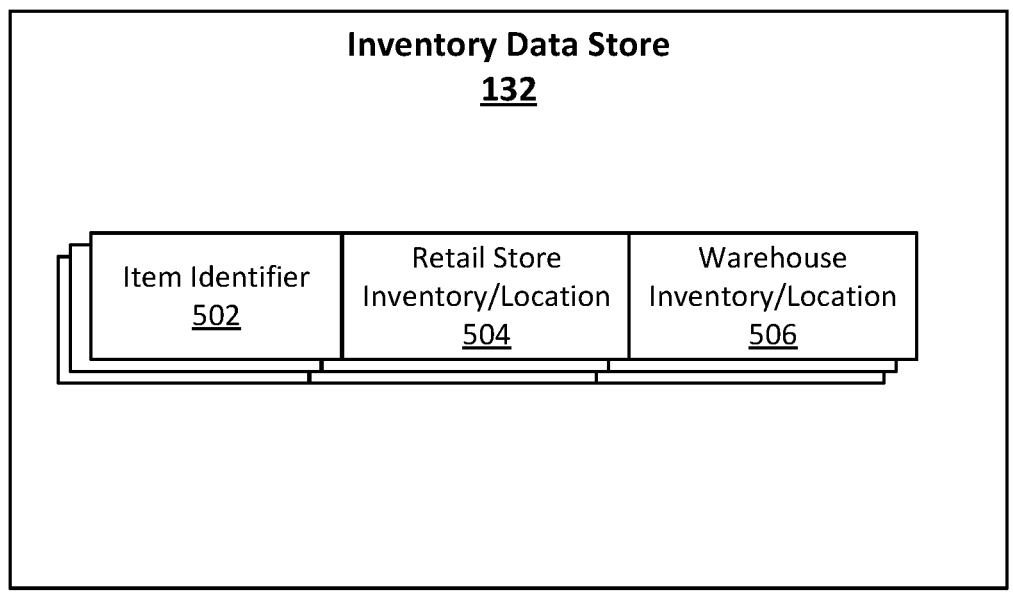
FIG. 5 displays a detailed block diagram of the inventory datastore of FIG. 2.

FIG. 5 illustrates a detailed block diagram of the inventory datastore 132 of FIG. 2. The inventory datastore 132 stores information pertaining to each item in inventory. In some embodiments, the data is stored in tables or is otherwise organized by item. In the example of FIG. 5, each row of the table represents an item and each column of the table represents characteristics of the item pertinent to order processing. Here each row includes an item identifier 502, a retail store inventory/location 504, and a warehouse inventory/location 506.

The item identifier 502 provides a means for identifying an individual item. For example, the item identifier could be a unique name comprising alphanumeric symbols. Alternatively, the item identifier 502 could be a unique item number. The item identifier 502 could be linked to a barcode or other means for scanning and identifying an item. Still further, the item identifier 502 could be a unique name comprising characters, such as the item name, and another identifying detail (i.e., the color, size, package quantity).

The retail store location 504 can identify one or more locations at which the item can currently be located. The retail store location 504 can serve as an indicator of availability of inventory. In instances where the item is not available at any retail store location, this field may be blank or otherwise indicate lack of availability. The retail store location 504 can also communicate with store map engine 320 to provide a location of items to the user.

In an example, a user may add an item to their shopping cart, but the item is indicated by the inventory datastore 132 as not available in their default retail location (or a retail location selected by the user). The inventory datastore 132 may tell the user that the items is only available at a different retail location or that the user must order that particular item and have it shipped.

The warehouse inventory/location 506 identifies one or more locations where the item can currently be located. However, this refers to warehouse locations rather than in store locations. Indication of warehouse locations having an item in stock serve as an indicator of availability. Again, in instances where the item is not available at any warehouse location, this field may be blank or otherwise indicate lack of availability. Items only available at a warehouse may be selected to be shipped to a retail location or the user's address.

Figure 6:
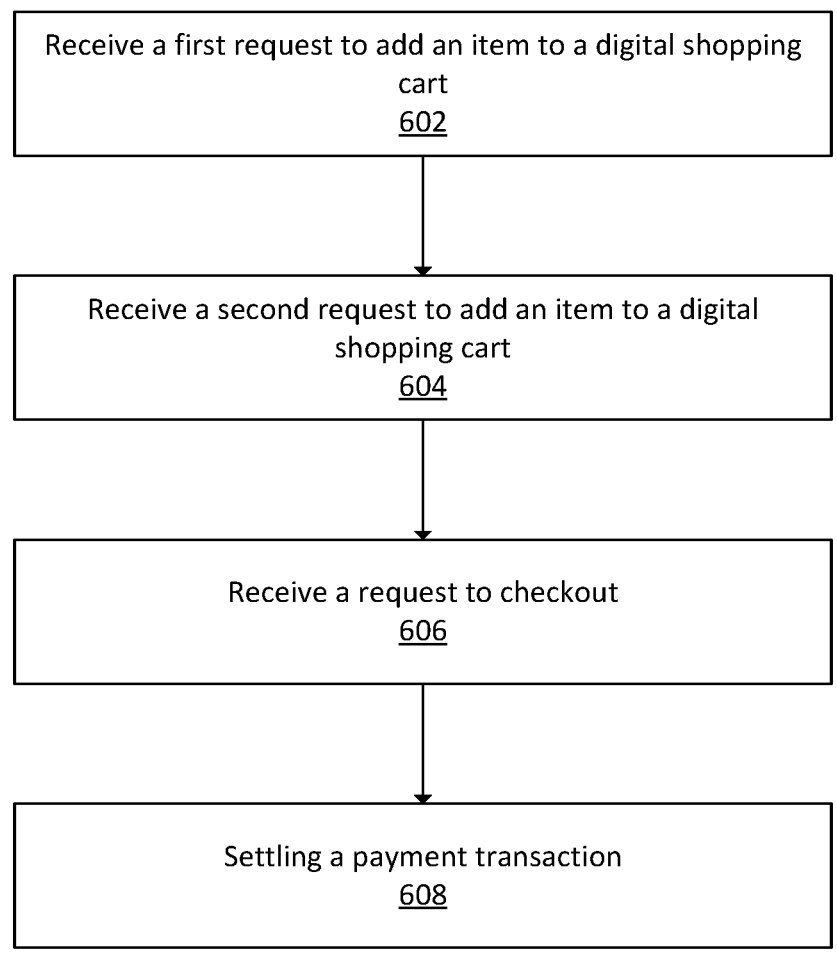
FIG. 6 is an example method of using the digital cart management system.

FIG. 6 illustrates a general flowchart of a method 600 for using a digital shopping cart and checkout process in a retail location, according to an example embodiment. The method can be performed, for example, by a mobile device 102 of a user (or an application installed thereon that implements a digital cart management system 130) in conjunction with a server 150 for managing feedback to the application regarding item selections.

At 602, a first request is received. The first request is a request to add an item to a digital shopping cart. This occurs for example, when a user is shopping in a retail location and selects an item to purchase. The user picks the item, places it in their physical cart, and indicates to the digital shopping cart application which item they have selected. The user can do this by speaking into the application and reciting a name of the product they selected. Alternatively, the user can scan a code on the item. Still further, the user may select the item from a list of items presented by the digital cart application 210 on a mobile device 102.

In use, a user may elect to provide voice input to the application such as "Add frozen peas to my cart." The user may alternatively elect to provide voice input such as "Add Archer Farms frozen peas to my cart." It is noted that, in instances where a voice input to the application indicates two or more possible products (e.g., where a voice input does not indicate a brand or size of product selected and multiple brands or sizes are available), the application may receive an indication that multiple items may be indicated, and may present more than one item to the user. The items can be, for example, ordered based on a likelihood of user selection (e.g., based on prior user purchases of similar items) for ease of selection by the user. The user may then provide a secondary input (e.g., by touch selection of the desired item, or scanning an item bar code, etc.) to select the one desired item from among the identified possible items.

At optional step 604, a second request is received. The second request may be a request to add another item to a digital shopping cart. The process for adding another item to a digital shopping cart is the same as described above for adding a first item to the digital shopping cart. A user may add as many items to the digital shopping cart as they want to purchase.

At 606, a request to checkout is received. The request may be an audible response by the user, for example, "I'm ready to check out." Alternatively, the request may be performed by clicking on a button within the application. Still further, a request to checkout may be initiated when the uses crosses a threshold in the retail location, for example the exit doors. This can be sensed, for example, by detecting a location of the mobile device that has the application installed thereon, e.g., by way of in-store signal triangulation/beacon-based technologies, or based on disconnection of the mobile device from a local network. Other methods of sensing when the user has exited the store (e.g., optical, image recognition, etc.) may be used as well, in alternative embodiments.

At 608, a payment transaction is settled. Settling a transaction includes, at least, processing a payment and providing a receipt to the user. Payment processing can be, in example embodiments, based on payment information previously entered into the application.

Figure 7:
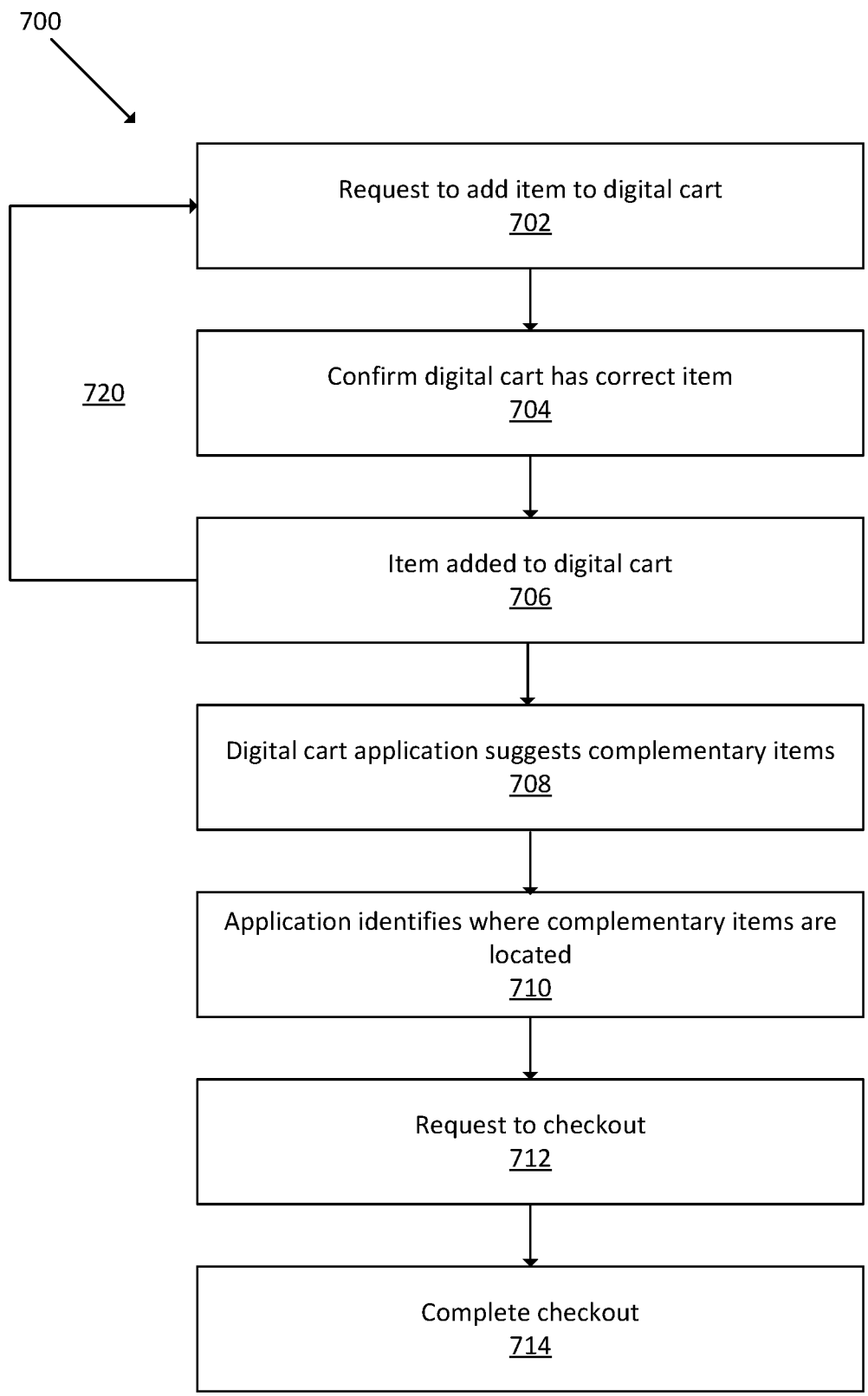
FIG. 7 is another example method of using the digital cart management system.

FIG. 7 illustrates another example method 700 of using a digital shopping cart application by a user in a retail location.

At 702, a request to add an item to a digital cart is received. An item is added to the digital cart when a user selects an item and indicates to the digital shopping cart application which item they want to purchase. The user can do this by speaking into the application and reciting which product they selected. Alternatively, the user can scan a code on the item, or type the item description in the application.

At 704, the digital cart application confirms that it has identified the correct item. The digital cart receives the request to add an item to the digital cart and searches the datastore of items to find the correct item. In an example, the digital cart application 210 presents the user with the item it believes is the item the user has elected to purchase, and the user confirms it is the correct item. In another example, the digital cart application 210 presents more than one item and the user must select which item is the correct item. The user may confirm by responding audibly or pressing a confirmation button on the mobile device, as noted above.

The digital cart application 210 may utilize a number of factors to reduce the number of potential items the user may request to add to the digital cart. In a first example, the digital cart application may reduce the number of potential items by sorting only the items in stock at the retail location the user is shopping. In another example, the digital cart application 210 may use the user's shopping list or shopping history to reduce the number of potential items the user may request to purchase. In yet another example, the digital cart application 210 uses the user's shopping history to reduce the number of potential items the user is requesting to add to the digital cart.

At 706, the item is added to the digital cart. The process 720 for requesting to add an item to the digital cart, confirming the item, and adding the item to the digital cart is repeated as many times as necessary.

It is noted that, in some instances, the user may see an item that he or she wishes to purchase, but it may be inconvenient for the user to pick up and carry the item out of the store. Accordingly, in some embodiments, the digital cart application 210 can present the user with a "ship to me" option for one or more of the items selected by the user. The "ship to me" option indicates that the user will not take the item from the store, but instead represents a request that the store ship the item to the user at some time in the future. In such instances, the user may elect (or have predefined) shipping options for the item, including either a specific timeframe for shipping or method of shipping (e.g., using a 2 day shipping arrangement for nonperishable items, or electing a same-day delivery service and identifying a time window for delivery of the item, in the event the item is perishable or otherwise eligible for same-day delivery).

At 708, the digital cart application 210 suggests complementary items. Complementary products may refer to items that may be used together, i.e., those that complement one another in their function. For example, if the user purchases hot dogs, the application suggests hot dog buns. Such complementary items can be identified, for example, using complementary item engine 318 described above.

At 710, the digital cart application 210 identifies where the complementary items are located within the retail location. The digital cart application 210 communicates with the store map engine 320 and the inventory datastore 216 to determine where items are located within the retail store where the user is located. Then the digital cart application 210 indicates to the user where the item is located.

The digital cart application 210 is also capable of indicating where other items are located in the retail location. For example, the user may ask the digital cart application 210 where a specific item is located.

At 712, a request to checkout is received. The user may request a checkout by responding audibly or pressing a checkout button on the mobile device 102.

At 714, the checkout is completed. A completed checkout has processed all the items placed in the digital cart, processed a payment, and provided a receipt to the user.

Figure 8:
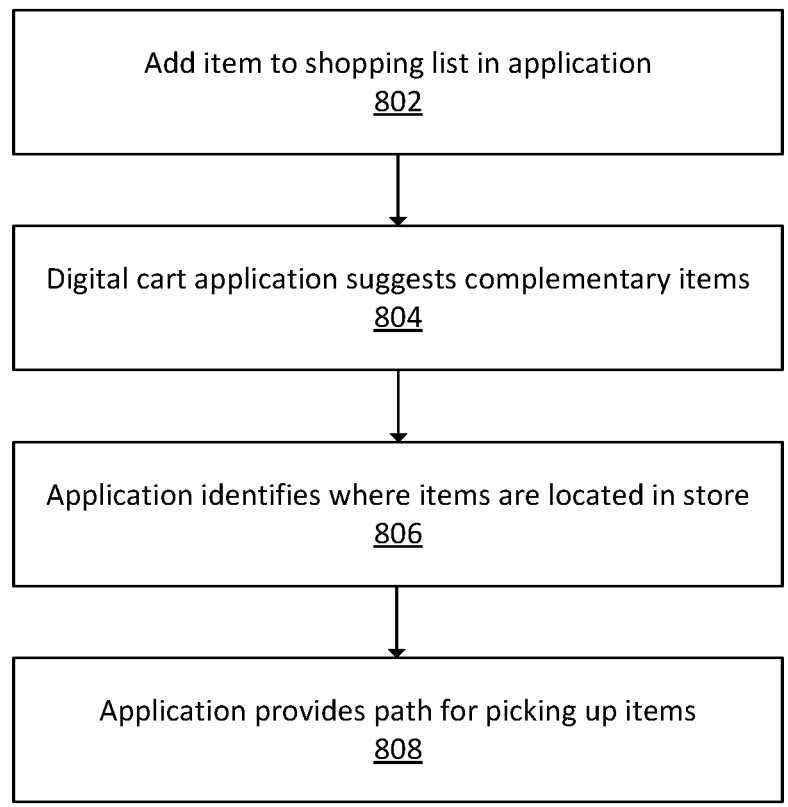
FIG. 8 is yet another example method of using the digital cart management system

FIG. 8 illustrates an example method 800 of adding items to a shopping list within the digital cart application 210 and utilizing the shopping list to shop within a retail location.

At 802, an item is added to a shopping list. In a first example, a user may add an item to a shopping list by audibly indicating to the application that they want to add an item to their shopping list. In another example, a user can browse items within the application or online and then select to add an item to the shopping list. The shopping list is visible to the user when they are shopping within a retail location.

At 804, the digital cart application 210 suggests complementary items. Complementary products may refer to items that may be used together, i.e., those that complement one another in their function, as noted above.

At 806, the digital cart identifies where items are located in a retail location. The retail location may be one that the user has indicated to be their "home" or default retail location. In another embodiment, the digital cart application 210 utilizes GPS to determine which retail location the user is at.

At 808, the digital cart application 210 provides a path to the user for picking up the items. The path provided allows a user to be efficient when shopping at the retail location and complete the shopping process in a timely manner. The user can then proceed along the path, select the items, and perform a checkout process as previously described.

Figure 9:
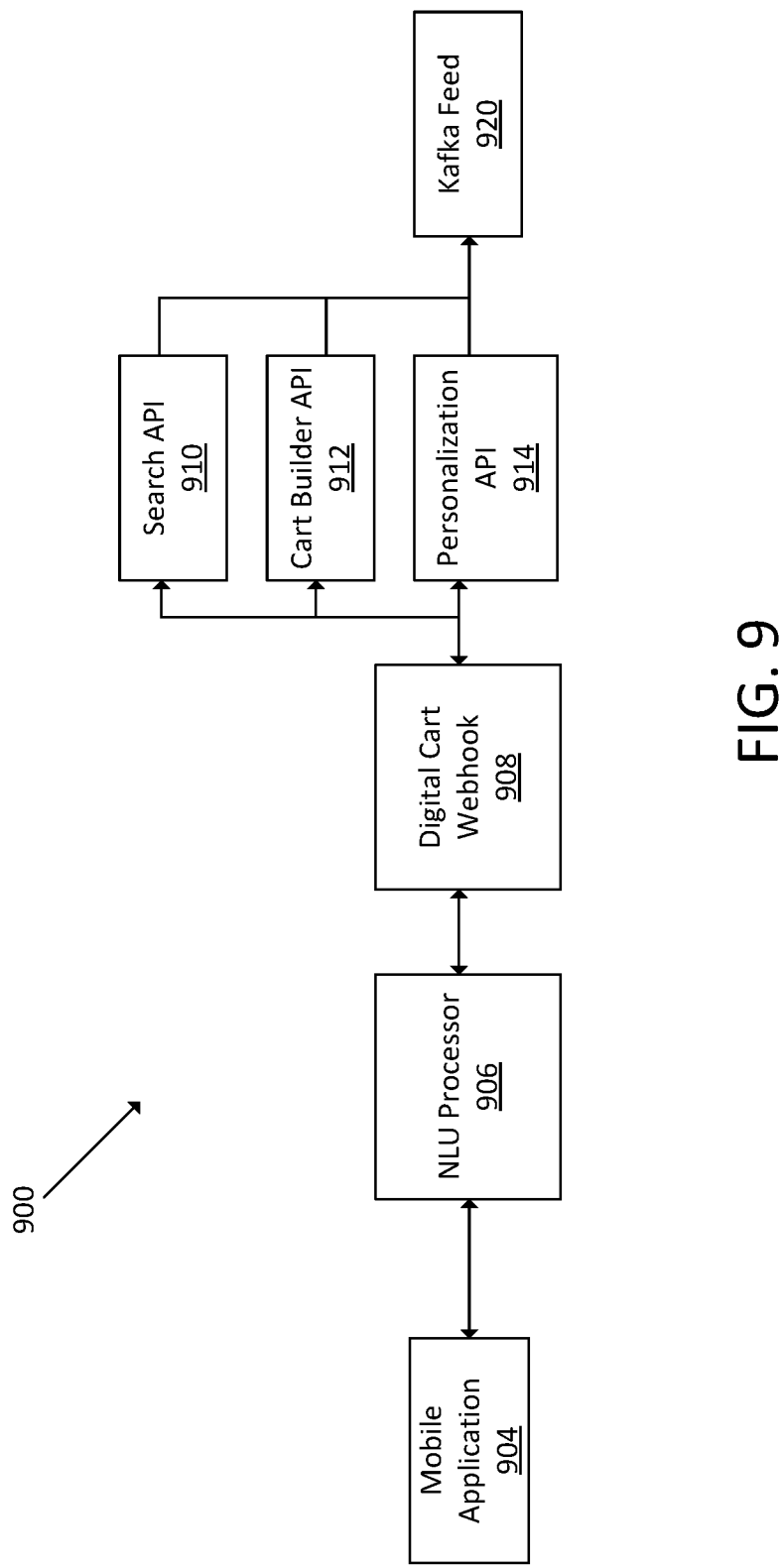
FIG. 9 illustrates an example block diagram of a system architecture of a digital cart management system.

FIG. 9 illustrates an example architecture 900 of the digital cart application 210. A mobile application 904 communicates with a natural language understanding (NLU) processor 906 to receive audible inputs from the user and process the request.

The natural language understanding processor 906 can be implemented using various techniques. In some embodiments, the digital cart application 210 can access a third party natural language processing library via an API; such a library may be incorporated into the mobile application or accessed remotely. To ensure reliable processing even where a network connection might be unreliable, the library may be managed locally.

The NLU processor 906 communicates with a digital cart webhook 908. The digital cart webhook 908 provides an interface between the digital cart application 210 and a plurality of server APIs that assist with item identification, processing, and checkout. In the embodiment shown, the digital cart webhook 208 facilitates communication with a search API 910 to find identify the correct item, a cart builder API 912 to add the item to the digital cart, and a personalization API 914 to link the digital cart to the appropriate user. The search API 910 functions to find the correct item to be added to the digital cart. The cart builder API 912 maintains all items added to the digital cart until a time at which the user completes the checkout process. The personalization API 914 maintains customer information and default settings for the user.

Finally, the search API 910, cart builder API 912, and personalization API 914 communicate with a streaming data feed 920. The streaming data feed 920 can be used to provide information to other server-based systems, e.g., for purposes of facilitating checkout, or providing feedback to the retailer regarding the operations performed by the user via the digital cart application 210.

In use, in example embodiments, the mobile application 904 can post requests to a server via a markup language request. The request integrates feedback from the NLU processor 906 as well as information known about the user by the digital cart application 210, which is passed to a server system for processing via the webhook 908. Such a request can include, for example: a timestamp, a session identifier, keywords extracted from voice input by the NLU processor 906, information about the particular store where the user is located, tokens to track a "conversation" by that user (for purposes of tracking of voice keywords), as well as various additional intent and option parameters. A response may indicate an action taken in response to the request, such as adding an item to the user's cart, or requesting additional feedback regarding the item intended to be added. In the case an item is added to the user's cart, a response to the digital cart application 210 can include, for example, a link to information about the item that was added to the cart, as well as information about the request processed by the server. Such information about the request being processed can include: whether a further user response is expected, an image, text associated with one or more items, whether complementary items are to be displayed to the user, and various other messages. In example embodiments, the transmitted request and received response are exchanged as HTTP messages by the webhook 908 between server and mobile device environments.

Figure 10:
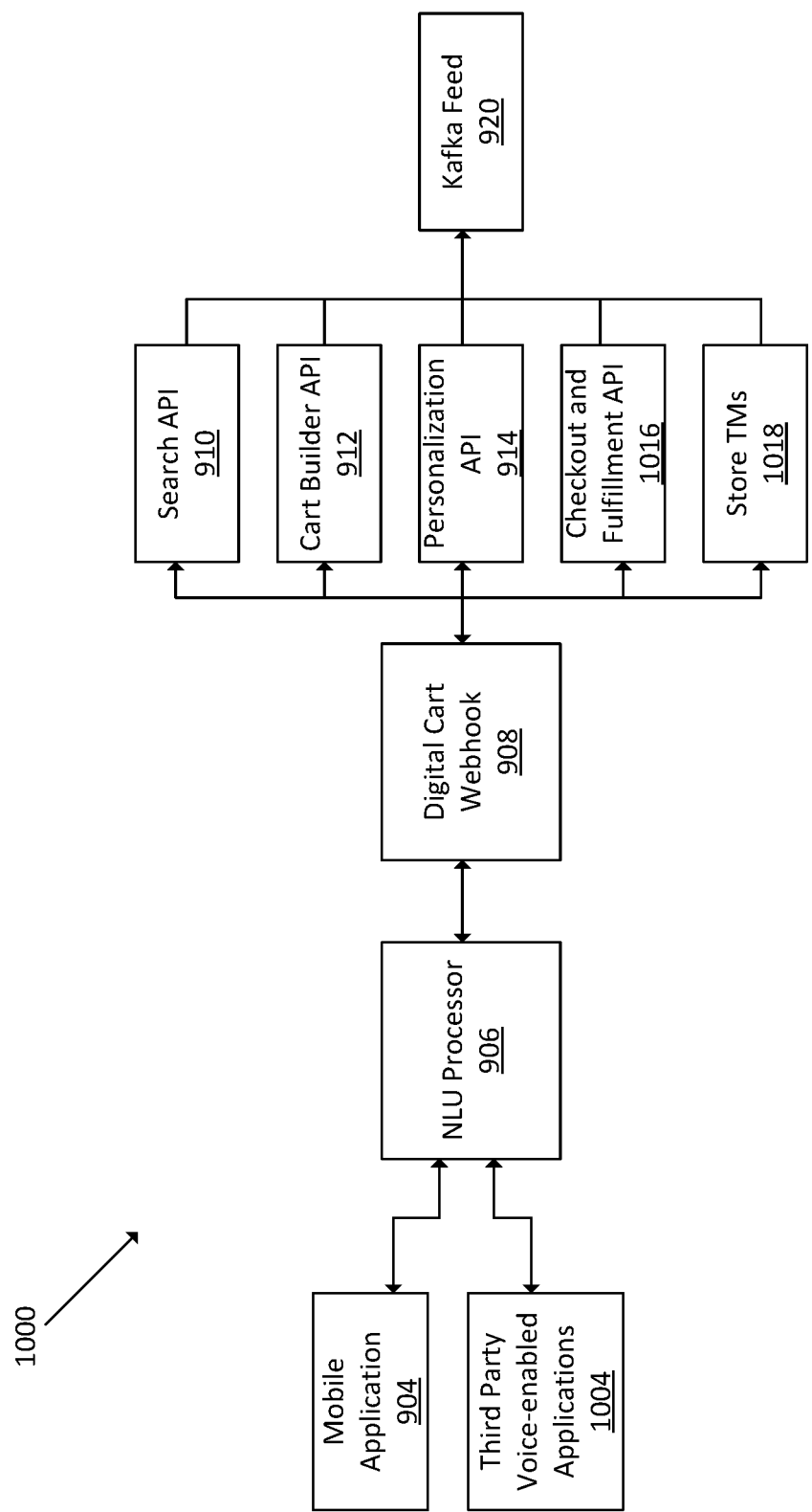
FIG. 10 illustrates an example scalable block diagram of a system architecture of a digital cart management system.

FIG. 10 illustrates an example scalable architecture 1000 for the digital cart application 210. Generally, FIG. 10 illustrates an arrangement in which the architecture 900 of FIG. 9 can be extended to various additional user applications and additional server processes. In particular, in the embodiment shown, either the mobile application 904 or a third party voice-enabled application 1004 may be used to add items to a digital cart application 210. Example third party voice-enabled applications 1004 can include, for example: Alexa (provided by Amazon.com, Inc. of Seattle, Washington), Google Assistant (by Google LLC of Menlo Park, California), Cortana (provided by Microsoft Corporation of Redmond, Washington), or Facebook (provided by Facebook, Inc. of Menlo Park, California). The mobile application 904 and/or a third party voice-enabled application 1004 communicates with a natural language understanding (NLU) processor 906 to receive audible inputs from the user and process the request.

The NLU processor 906 communicates with a digital cart webhook 908. The digital cart webhook 908 also communicates with a search API 910 to find identify the correct item, a cart builder API 912 to add the item to the digital cart, a personalization API 914 to link the digital cart to the appropriate user, a checkout and fulfillment API 1016 to process the checkout, and a store team member (TM) engine 1018, to contact employees if needed. The checkout and fulfillment API 1016 functions to complete and process the checkout. The Store TM engine 1018 contacts a store employee as needed.

The search API 910, cart builder API 912, personalization API 914, checkout and fulfillment API 1016, and store TM engine 1018 communicate with a streaming data feed 920.

Although only one example is shown, the architecture 1000 is scalable to increase personalization to store more guest information, checkout quicker, identify guests who needs help in the retail location, and add additional features.

Figure 11:
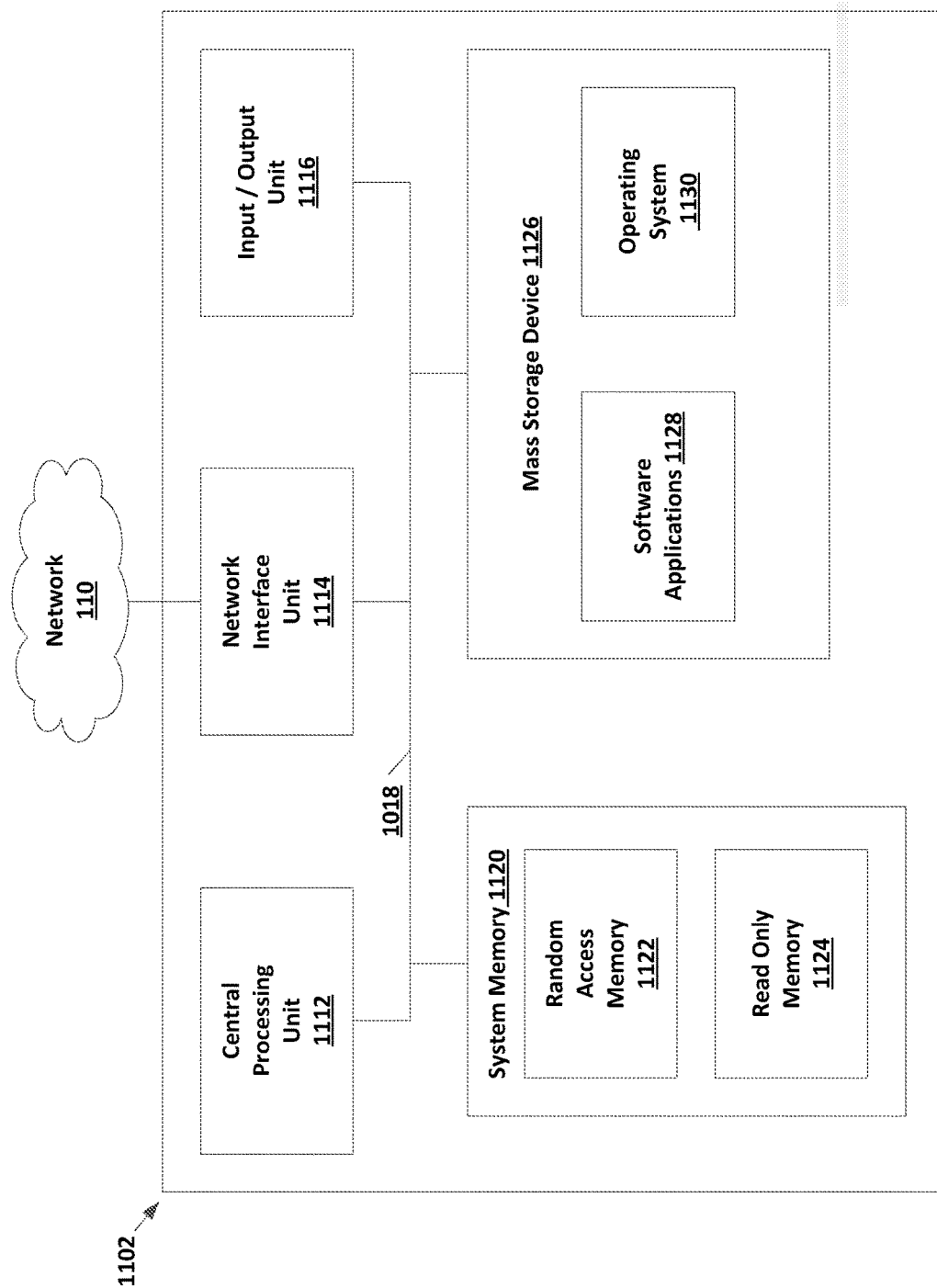
FIG. 11 displays a schematic diagram of an example computing device usable in the system of FIG. 1.

Referring now to FIG. 11, an example block diagram of a computing system 1102 is shown that is useable to implement aspects of the digital cart management system 130 of FIG. 1. In the embodiment shown, the computing system 1102 includes at least one central processing unit ("CPU") 1112, a system memory 1120, and a system bus 1118 that couples the system memory 1120 to the CPU 1112. The system memory 1120 includes a random access memory ("RAM") 1122 and a read-only memory ("ROM") 1124. A basic input/output system that contains the basic routines that help to transfer information between elements within the computing system 1102, such as during startup, is stored in the ROM 1124. The computing system 1102 further includes a mass storage device 1126. The mass storage device 1126 is able to store software instructions and data.

The mass storage device 1126 is connected to the CPU 1112 through a mass storage controller (not shown) connected to the system bus 1118. The mass storage device 1126 and its associated computer-readable storage media provide non-volatile, non-transitory data storage for the computing system 1102. Although the description of computer-readable storage media contained herein refers to a mass storage device, such as a hard disk or solid state disk, it should be appreciated by those skilled in the art that computer-readable data storage media can include any available tangible, physical device or article of manufacture from which the CPU 1112 can read data and/or instructions. In certain embodiments, the computer-readable storage media comprises entirely non-transitory media.

Computer-readable storage media include volatile and non-volatile, removable and non-removable media implemented in any method or technology for storage of information such as computer-readable software instructions, data structures, program modules, or other data. Example types of computer-readable data storage media include, but are not limited to, RAM, ROM, EPROM, EEPROM, flash memory or other solid state memory technology, CD-ROMs, digital versatile discs ("DVDs"), other optical storage media, magnetic cassettes, magnetic tape, magnetic disk storage or other magnetic storage devices, or any other medium which can be used to store the desired information and which can be accessed by the computing system 1102.

According to various embodiments of the invention, the computing system 1102 may operate in a networked environment using logical connections to remote network devices through a network 110, such as a wireless network, the Internet, or another type of network. The computing system 1102 may connect to the network 110 through a network interface unit 1114 connected to the system bus 1118. It should be appreciated that the network interface unit 1114 may also be utilized to connect to other types of networks and remote computing systems. The computing system 1102 also includes an input/output unit 1116 for receiving and processing input from a number of other devices, including a touch user interface display screen, or another type of input device. Similarly, the input/output unit 1116 may provide output to a touch user interface display screen or other type of output device.

As mentioned briefly above, the mass storage device 1126 and the RAM 1122 of the computing system 1102 can store software instructions and data. The software instructions include an operating system 1130 suitable for controlling the operation of the computing system 1102. The mass storage device 1026 and/or the RAM 1122 also store software instructions, that when executed by the CPU 1112, cause the computing system 1102 to provide the functionality discussed in this document. For example, the mass storage device 1126 and/or the RAM 1122 can store software instructions that, when executed by the CPU 1112, cause the computing system 1102 to receive and analyze inventory and demand data.

As should be appreciated, the various aspects (e.g., portions, components, etc.) described with respect to the figures herein are not intended to limit the systems and methods to the particular aspects described. Accordingly, additional configurations can be used to practice the methods and systems herein and/or some aspects described can be excluded without departing from the methods and systems disclosed herein.

Similarly, where steps of a process are disclosed, those steps are described for purposes of illustrating the present methods and systems and are not intended to limit the disclosure to a particular sequence of steps. For example, the steps can be performed in differing order, two or more steps can be performed concurrently, additional steps can be performed, and disclosed steps can be excluded without departing from the present disclosure.

Although specific aspects were described herein, the scope of the technology is not limited to those specific aspects. One skilled in the art will recognize other aspects or improvements that are within the scope of the present technology. Therefore, the specific structure, acts, or media are disclosed only as illustrative aspects. The scope of the technology is defined by the following claims and any equivalents therein.

The invention claimed is:

1. A digital checkout method, the method comprising:
receiving, at a mobile device, a customer identifier associated with a user including a payment method and a digital cart;
receiving, via a global positioning system (GPS) of the mobile device, a retail location of the user, the retail location associated with a subset of in-stock items selected from an inventory datastore of a retailer, the inventory datastore tracking a current availability status of a plurality of inventory items across a plurality of retailer locations including the retail location;
determining, with a predictive engine, the subset of in-stock items at the retail location;
receiving, at the mobile device, a first voice input including a request to add an item to the digital cart;
identifying, with the predictive engine, a likelihood of user selection based on the first voice input of each of a plurality of likely items from the subset of in-stock items and a purchase history of the user, and identifying a most likely selected item from the plurality of likely items;
responsive to identifying the most likely selected item, displaying the most likely selected item on a graphical user interface of the mobile device;
identifying and displaying at least one additional item on the graphical user interface, the at least one additional item being complementary to the most likely selected item, wherein identifying the at least one additional item comprises generating a model of item complementarity based on:
performing a vectorization of a pair of item descriptions from the plurality of likely items to generate text embeddings that are indicative of similarity between the pair of item descriptions;
performing classification of the vectorized pairs of item descriptions to determine an extent of complementarity by scoring the pairs of items using a Siamese network, the Siamese network receiving as its input the generated text embeddings and have been previously trained on known pairs of complementary items, wherein the Siamese network projects the generated text embeddings into an N-dimensional vector space where the generated text embeddings for items that are complementary to each other are located closer in space than a predetermined threshold; and
selecting one or more items located closer within the N-dimensional vector space than the predetermined threshold as the one or more complementary items;
obtaining item information for the most likely selected item and the at least one additional item including a description and an item price from the inventory datastore, and associating the item information with each of the most likely selected item and the at least one additional item at the graphical user interface;
receiving a request to add the most likely selected item or the at least one additional item to the digital cart;
receiving a request to complete a digital checkout; and
settling a payment transaction including payment for the digital cart.

2. The method of claim 1, wherein the request to add the most likely selected item or the at least one additional item to the digital cart includes an input selected from a tactile input or a voice input.

3. The method of claim 1, wherein the request to complete a digital checkout includes an input selected from a tactile input or a voice input.

4. The method of claim 1, wherein receiving the request to add the most likely selected item or the at least one additional item to the digital cart comprises receiving a second voice input and receiving the request to complete a digital checkout comprises receiving a third voice input.

5. The method of claim 1, wherein settling the payment transaction includes automatically charging the payment method associated with the customer identifier and generating a receipt and electronically sending the receipt to the user.

6. The method of claim 1, wherein identifying and displaying at least one additional item on the graphical user interface further comprises playing an audible message.

7. The method of claim 1, wherein the customer identifier includes a shopping list and purchase history of the user.

8. The method of claim 7, further comprising receiving a request to add at least one item to the shopping list.

9. The method of claim 7, further comprising presenting an in-store location for each item listed on the shopping list.

10. The method of claim 1, further comprising:
    identifying, by the predictive engine, a predetermined shipping method associated with the user; and
    receiving an election by the user of the predetermined shipping method.

11. A system configured for providing a digital checkout, the system comprising:
    a computing system comprising at least one processor communicatively connected to a memory, the memory storing computer-executable instructions comprising a software tool which when executed causes the system to:
    receive, at a mobile device, a customer identifier associated with a user including a payment method and a digital cart;
    receive, via a global positioning system (GPS) of the mobile device, a retail location of the user, the retail location associated with a subset of in-stock items selected from an inventory datastore of a retailer, the inventory datastore tracking a current availability status of a plurality of inventory items across a plurality of retailer locations including the retail location;
    determine, with a predictive engine, the subset of in-stock items at the retail location;
    receive, at the mobile device, a voice input including a request to add an item to the digital cart;
    identify, with the predictive engine, a likelihood of user selection based on the voice input of each of a plurality of likely items from the subset of in-stock items and a purchase history of the user, and identifying a most likely selected item from the plurality of likely items;
    responsive to identifying the most likely selected item, display the most likely selected item on a graphical user interface of the mobile device;
    identify and display at least one additional item on the graphical user interface, the at least one additional item being complementary to the most likely selected item, wherein identifying the at least one additional item comprises generating a model of item complementarity based on:
        performing a vectorization of a pair of item descriptions from the plurality of likely items to generate text embeddings that are indicative of similarity between the pair of item descriptions;
        performing classification of the vectorized pairs of item descriptions to determine an extent of complementarity by scoring the pairs of items using a Siamese network, the Siamese network receiving as its input the generated text embeddings and have been previously trained on known pairs of complementary items, wherein the Siamese network projects the generated text embeddings into an N-dimensional vector space where the generated text embeddings for items that are complementary to each other are located closer in space than a predetermined threshold; and
        selecting one or more items located closer within the N-dimensional vector space than the predetermined threshold as the one or more complementary items;
    obtain item information for the most likely selected item and the at least one additional item including a description and an item price from the inventory datastore, and associating the item information with each of the most likely selected item and the at least one additional item at the graphical user interface;
    receive a request to add the most likely selected item or the at least one additional item to the digital cart;
    receive a request to complete a digital checkout; and
    settle a payment transaction including payment for the digital cart.

12. The system of claim 11, wherein the request to add the most likely selected item or the at least one additional item to the digital cart includes an input selected from a tactile input or a voice input.

13. The system of claim 11, wherein the request to complete a digital checkout includes an input selected from a tactile input or a voice input.

14. The system of claim 11, wherein receiving the request to add the most likely selected item or the at least one additional item to the digital cart comprises receiving a second voice input; and
    receiving the request to complete a digital checkout comprises receiving a third voice input.

15. The system of claim 11, wherein settling the payment transaction includes automatically charging the payment method associated with the customer identifier and generating a receipt and electronically sending the receipt to the user.

16. The system of claim 11, wherein identifying and displaying at least one additional item on the graphical user interface further comprises playing an audible message.

17. The system of claim 11, wherein the customer identifier includes a shopping list and purchase history of the user.

18. The system of claim 17 further comprising receiving a request to add at least one item to the shopping list.

19. The system of claim 17, further comprising presenting an in-store location for each item listed on the shopping list.

20. The system of claim 11, further comprising:
    identifying, by the predictive engine, a predetermined shipping method associated with the user; and
    receiving an election by the user of the predetermined shipping method.

* * * * *